United States Patent

Neier

Patent Number: 5,544,822
Date of Patent: Aug. 13, 1996

[54] HAY CUTTER WITH FORK LIFT

[75] Inventor: Benjamin R. Neier, Dodge City, Kans.

[73] Assignee: Roto-Mix Enterprise, Ltd., Dodge City, Kans.

[21] Appl. No.: 353,704

[22] Filed: Dec. 12, 1994

[51] Int. Cl.6 .............. B02C 1/00; B02C 21/02
[52] U.S. Cl. .............. 241/101.73; 241/101.742; 241/101.76; 241/605; 56/268; 83/928
[58] Field of Search ............... 56/264, 268, 296, 56/297, 299; 83/697, 784, 928; 241/101.72, 101.73, 101.742, 101.76, 101.77, 199.2, 262, 283, 605

[56] References Cited

U.S. PATENT DOCUMENTS

| 870,474 | 11/1907 | Scott. | |
| 3,830,438 | 8/1974 | Garrison. | |
| 4,094,427 | 6/1978 | White et al. | 241/605 X |
| 4,336,732 | 6/1982 | Liet et al. | 241/605 X |
| 4,411,573 | 10/1983 | Townsend | 241/605 X |
| 4,531,880 | 7/1985 | Pagues | 241/605 X |
| 4,771,670 | 9/1988 | Woerman. | |
| 4,923,128 | 5/1990 | Ostrowski | 241/605 X |
| 5,033,684 | 7/1991 | Von Der Heide. | |
| 5,240,013 | 8/1993 | Johnson et al. | 241/605 X |
| 5,333,799 | 8/1994 | Posthumus | 241/605 X |

OTHER PUBLICATIONS

Undated brochure from RM International, Dodge City, KS, "Roto-Round Bale Cutter,".

Primary Examiner—Timothy V. Eley
Attorney, Agent, or Firm—Zarley, McKee, Thomte, Voorhees, & Sease

[57] ABSTRACT

A hay cutter and fork lift implement are mounted on the three point hitch of a tractor with a hydraulic cylinder interconnecting the inner ends of the hay cutter assembly and the fork lift assembly for applying equal and opposite pressure on each, such that when the cutter assembly reaches the limits of its downward travel by engaging the ground or being resisted by the hay being cut, the fork assembly will automatically pivot upwardly thereby raising the bale off the ground, allowing the cutting operation to be completed.

11 Claims, 4 Drawing Sheets

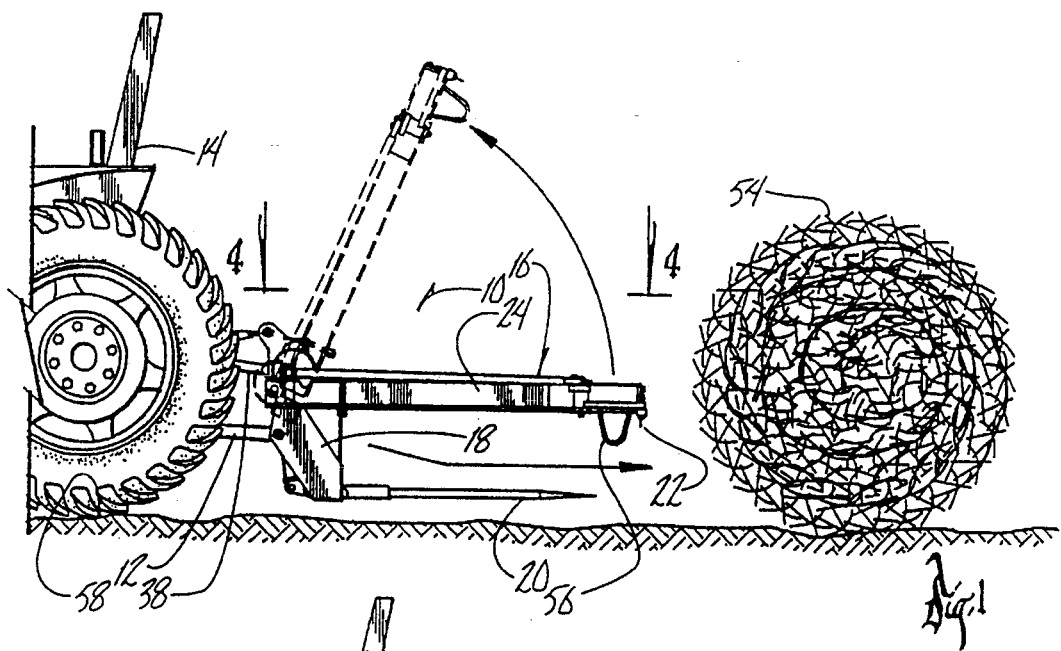
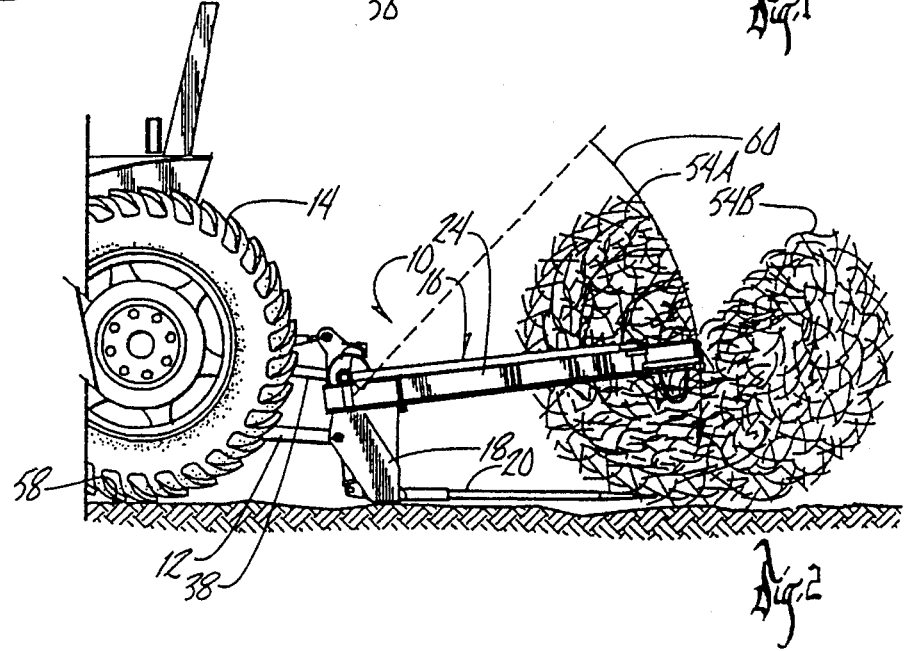
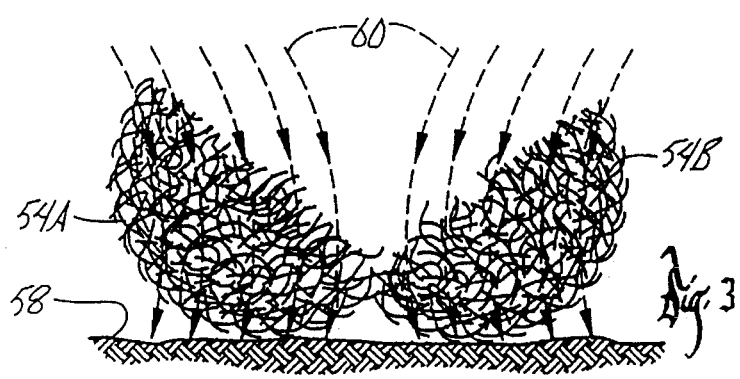

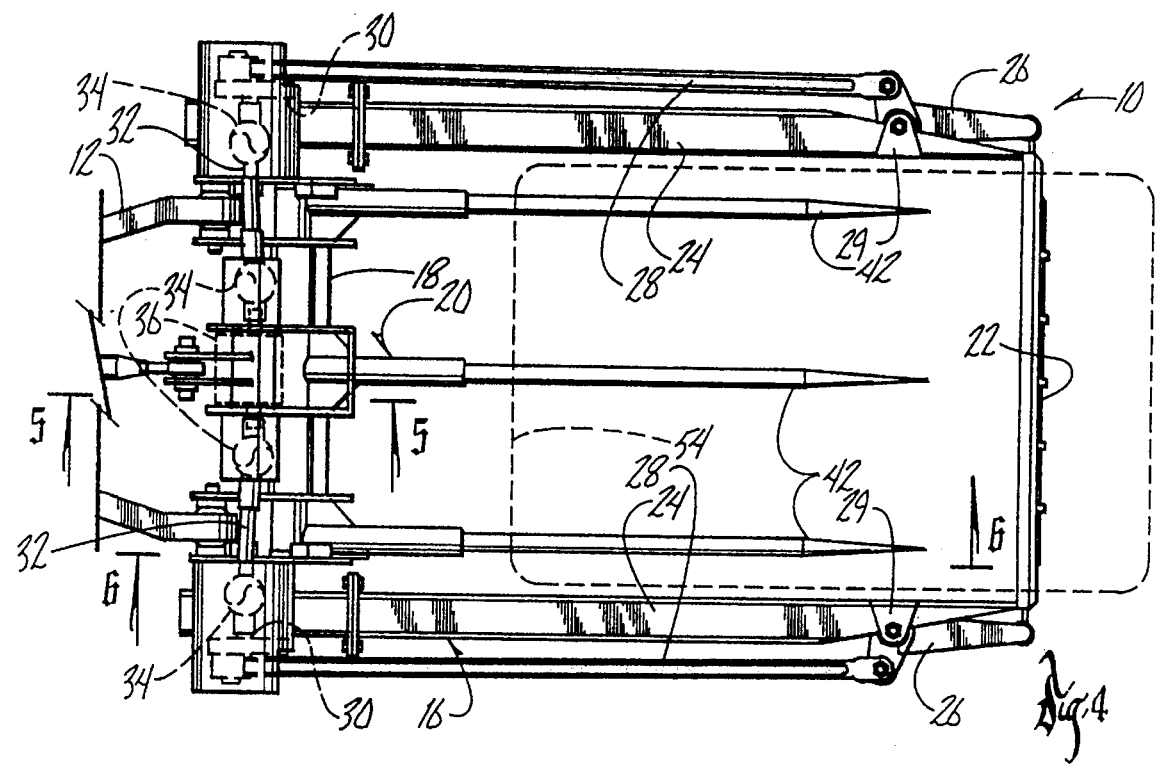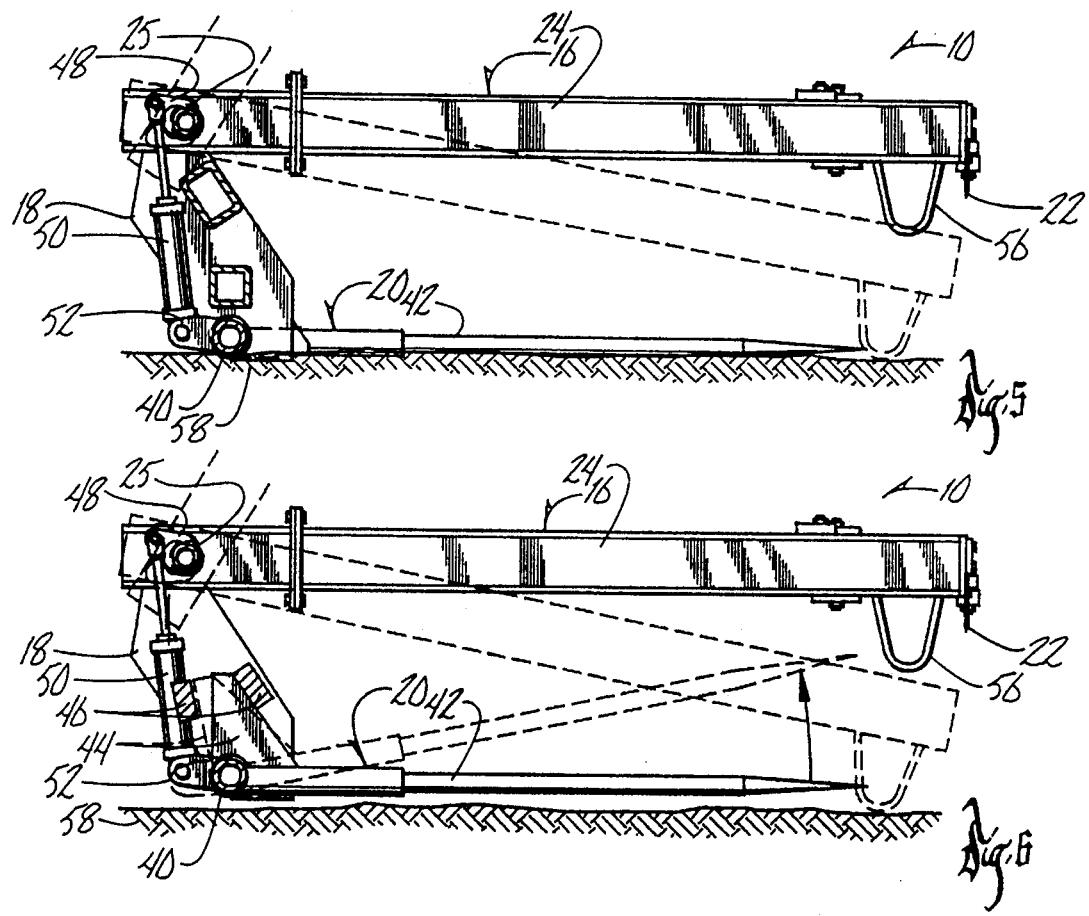

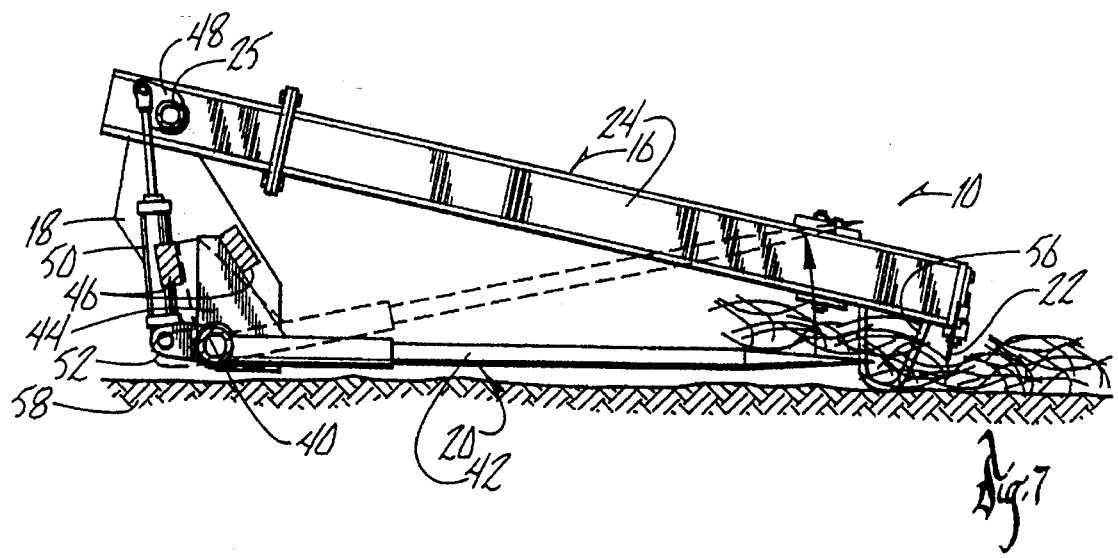
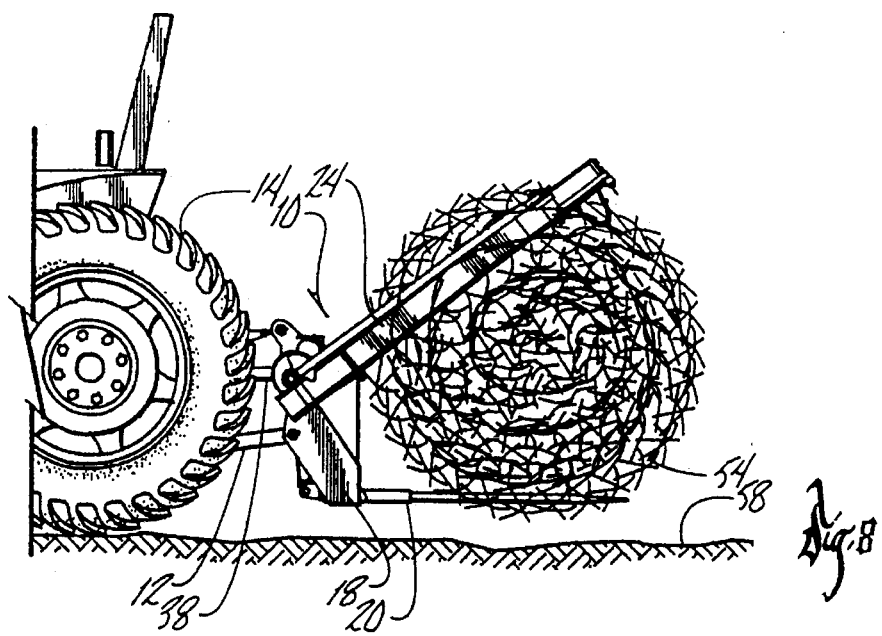

HAY CUTTER WITH FORK LIFT

BACKGROUND OF THE INVENTION

A successful system for cutting round bales involves a hay cutter with a fork lift being mounted on the three point hitch of a tractor wherein the hay cutter includes a cutter arm which pivots downwardly onto a bale of hay supported on the fork lift. The three point hitch allows the bale of hay to be transported on the fork. The cutting of the hay is accomplished when the fork is positioned on the ground.

While this system has operated generally successfully it presents a problem when the cutter has cut substantially through the bale of hay and engages the ground support surface. Stops on the cutter assembly prevent the sickle blades from being damaged by engaging the ground. The cut sections of the hay being supported on the fork and the ground cannot fall away, thus they tend to pinch the cutter sickle on its opposite sides, thereby limiting its downward travel.

What is needed is a system whereby the hay will be automatically raised off the ground when the cutter can no longer successfully cut the hay due to resistance from the ground or from being pinched by the oppositely disposed cut hay sections.

SUMMARY OF THE INVENTION

The problem of the prior art hay bale cutting system is overcome by this invention. This invention involves positioning a hydraulic cylinder between the cutter assembly and the fork assembly such that equal and opposite forces are applied to each and when the cutter assembly can no longer pivot downwardly, the fork assembly will pivot upwardly thereby raising the bale off the ground whereupon the cutter assembly can finish cutting through the bale of hay and the cut hay sections will be allowed to fall away in opposite directions. The ground support surface will be utilized through the majority of the cutting of the hay bale and it is only at the very end of the cutting operation that the bale is raised off the ground to allow the completion of the cutting operation. This is all done automatically as the cutter assembly and fork assembly are interconnected by the hydraulic cylinder power means.

DESCRIPTION OF THE DRAWINGS

FIG. 1 is a fragmentary side elevational view of the hay cutter with fork lift of this invention in position for loading a bale on the fork lift.

FIG. 2 is similar to FIG. 1 but showing the bale being cut into half sections.

FIG. 3 is a fragmentary side elevational view of a hay bale having been cut in half sections with markings indicating subsequent cutting of each bale half-section.

FIG. 4 is a top plan view taken along line 4—4 in FIG. 1 of the bale cutter with fork lift.

FIG. 5 is a cross sectional view taken along line 5—5 in FIG. 4 showing the cutter assembly pivoting downwardly into engagement with the ground support surface.

FIG. 6 is a cross sectional view taken along line 6—6 in FIG. 4 and showing the fork assembly pivoting upwardly after the cutting assembly has stopped its downward travel by engaging the ground support surface.

FIG. 7 is a view similar to FIGS. 5 and 6 showing the hay having been pivoted upwardly and the cutting assembly having completed the cutting through the hay.

FIG. 8 is a view similar to FIG. 1 but showing the bale of hay being transported on the fork and held thereon the bale cutter.

DESCRIPTION OF THE PREFERRED EMBODIMENT

Figure 9:
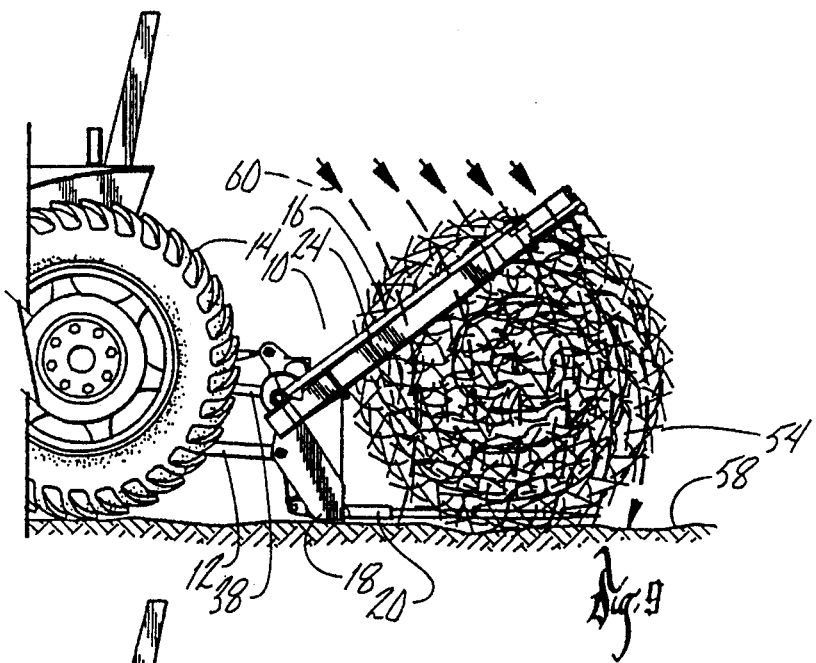
FIG. 9 is a view similar to FIG. 2 but showing the bale first being cut in sections starting with an outer peripheral section and then cutting subsequent sections from the bale.

The hay cutter with fork lift implement of this invention is referred to generally in FIG. 1 by the reference numeral 10 and is shown mounted on a the three point hitch 12 of a tractor 14. The implement 10 includes a cutter assembly 16 pivotally connected to a frame assembly 18 over a fork assembly 20 pivotally connected at the lower end of the frame assembly 18.

The specific cutter assembly 16 is not a part of this invention but includes a sickle 22 on the outer ends of oppositely disposed cutter arms 24 which are connected to a tube shaft 25 (see FIG. 5) mounted on the upper end of the frame assembly 18, thereby allowing the cutter assembly 16 to pivot between raised and lowered positions as seen in FIG. 1.

The sickle 22 is connected at opposite ends as seen in FIG. 4 to an "L" link 26 which in turn is pivoted to an ear 29 on the arm 24. The "L" link 26 is also connected to a rod 28 which is reciprocally connected to a crank 30 driven by a drive shaft 32. The drive shaft 32 extends between couplers 34 and is connected to a gear box 36 in turn connected to the PTO 38 of the tractor 14.

The fork assembly 20 includes a shaft 40 connected to the frame assembly 18 at its lower end. The shaft 40 has fork arms 42 extending rearwardly under the cutter assembly 16 and terminating short of the vertical plane containing the sickle 22. Pivotal stops 44 are rigidly mounted on the shaft 40 and move between stationary stops 46 on the frame assembly 18, thereby limiting the upward and downward movement of the fork assembly 20 to approximately twelve degrees as seen by the solid and dash line positions in FIG. 9.

The cutter assembly tube shaft 25 includes ears 48 extending rearwardly connected to the upper ends of hydraulic cylinders 50 which in turn are connected at their lower ends to ears 52 on the fork assembly tube shafts 40.

It is thus seen that operation of the hydraulic cylinders 50 to an extended position causes the cutter assembly 16 to pivot downwardly and the fork assembly 20 to pivot upwardly. The weight of a hay bale 54 will keep the fork assembly from pivoting upwardly until the hydraulic cylinder power means pressure on the fork assembly 20 overcomes this weight.

The cutter assembly arms 24 include downwardly extending stops 56 which function to engage the ground support surface 58 to limit the downward travel of the cutter assembly 16, thereby preventing the sickle 22 from being damaged by engaging the ground 58.

In operation, a bale of hay 54 is first loaded onto the fork assembly 20 by a raising the cuter assembly 16 to the position represented by dashed lines in FIG. 1. The tractor 14 is moved rearwardly until the fork assembly slides under the bale 54. The bale is positioned such that the sickle 22 is preferably over the mid-section of the bale 54 as seen in FIG. 2. The hydraulic cylinder 50 is then operated causing the cutter assembly 16 to move downwardly cutting the bale 54 into half sections 54A and 54B. When the cutter assembly 16 reaches the limit of its downward travel which is when the stops 56 engage the ground 58 or the hay squeezes the sickle 22 such that it can no longer cut the hay, the pressure on the fork assembly 20 will be sufficient to cause it to pivot upwardly thereby lifting the bale off the ground whereupon the sickle 22 can complete its cutting action by moving completely through the hay bale. It is seen that the bale is substantially cut from top to bottom while it is being substantially supported on the fork assembly 20 which is on the ground 58.

Figure 10:
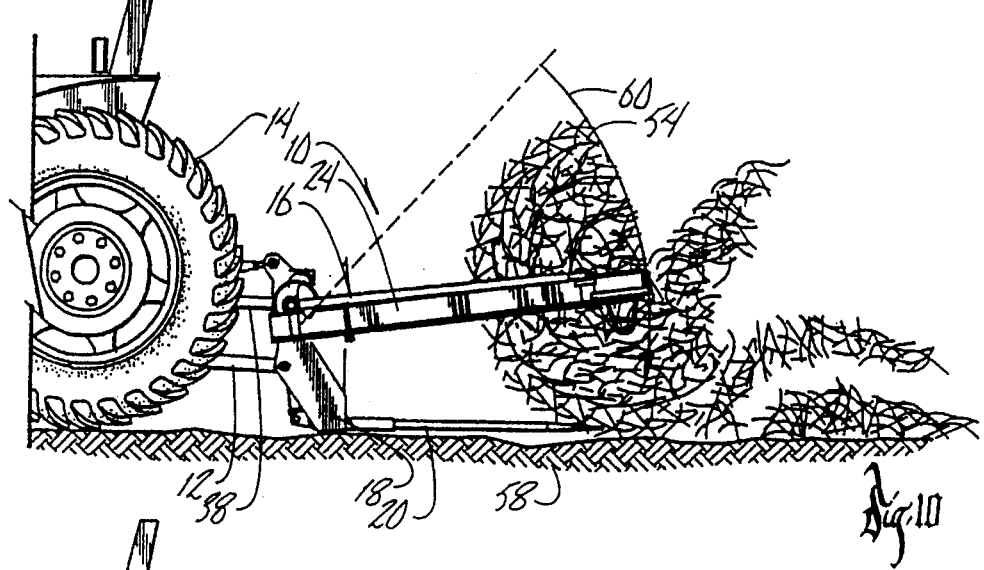
FIGS. 10 and 11 are similar to FIGS. 5–7 in showing these sequential steps in the bale cutting operation but showing the bale on the fork assembly with the bale being raised in FIG. 11 at the end of the bale cutting operation.
Figure 11:
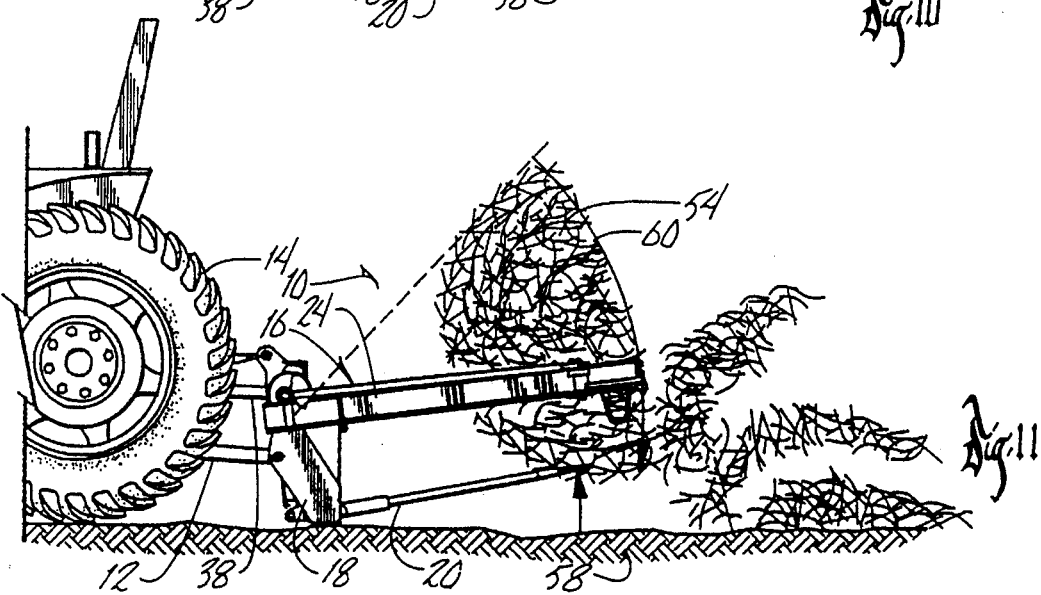

In FIGS. 9–11 the cutting operation begins not in the center of the bale as in FIG. 2 but at the outer layer followed by subsequent cuts moving across the bale as indicated by the dash lines 60. In FIG. 11 it is seen that on occasion the fork assembly 20 may start pivoting upwardly prior to the cutter assembly 16 engaging the ground as seen in FIG. 7. Normally, however, the upward pivotal movement of the fork assembly 20 will not start until the cutter assembly stops 56 engage the ground. Thus it is seen that the operation of this implement is totally automatic in terms of the fork assembly 20 pivoting the bale upwardly to allow the cutter assembly 16 to complete its cutting action on a hay bale 54.

What is claimed is:

1. A hay cutter with fork lift comprising, a frame assembly having upper and lower portions, a cutter assembly including a cutting arm having inner and outer ends with said inner end pivoted to said upper portion of said frame, and a downwardly facing cutting means on the outer end of said arm, a fork assembly having a fork arm with inner and outer ends and said inner end of said fork arm being pivoted to said frame below said cutter assembly, power means interconnecting said cutter arm and said fork arm for applying downward pressure on said cutting means and upward pivotal pressure on said fork arm for pivoting upwardly said fork arm whereby hay being cut by said cutting means can fall away from said cutting means.

2. The hay cutter with fork lift of claim 1 wherein said power means is a hydraulic cylinder.

3. The hay cutter with fork lift of claim 2 and the pressure applied to the hydraulic cylinder on said fork arm is equal and opposite to the pressure applied on said cutter arm.

4. The hay cutter with fork lift of claim 3 and said cutter arm and fork arm having pivotal axes with said cylinder being connected to said cutter arm and fork arm on the inner end of each on the side of the pivot axes opposite said outer ends of said cutting arm and fork arm.

5. The hay cutter with fork lift of claim 1 wherein said cutting means includes a sickle.

6. The hay cutter with fork lift of claim 1 wherein said cutting means has a travel path and said outer end of said fork arm is positioned adjacent said cutting means but not in said travel path to allow said cutting means to cut through hay on said fork arm.

7. The hay cutter with fork lift of claim 1 and said frame includes stops to limit upward and downward pivotal movement of said fork arm.

8. The hay cutter with fork lift of claim 7 wherein said fork arm is limited to pivotal movement between a horizontal down position and an up position of approximately twelve degrees.

9. A hay cutter and fork lift in combination comprising, a cutting assembly having opposite ends with a downwardly facing cutting means on one end movable in upward and downward directions along a travel path, a fork assembly below said cutting assembly including a fork arm having an outer end which extends to adjacent said cutting means but not into said travel path, power means operatively interconnecting said cutting means and said outer end of said fork arm such that substantially equal and opposite pressure is applied to each to lift hay on said fork arm off the ground and allow it to fall away from said cutting means as said cutting means cuts through said hay.

10. The hay cutter with fork lift of claim 9 wherein said fork arm is pivotal between a lowered position at ground level and a raised position with said upward pivotal movement occurring in response to a predetermined upward force having been applied to said fork arm.

11. The hay cutter of claim 9 wherein said cutting assembly includes a pair of oppositely disposed arms with said cutting means extending there between at their outer ends and said fork arm is one of at least two fork arms positioned between and below said cutting arms for pivotal movement upwardly and downwardly.

* * * * *